United States Patent [19]

Takakuwa

[11] Patent Number: 4,657,419
[45] Date of Patent: Apr. 14, 1987

[54] INFORMATION CARRIER, HAVING A ROUGHENED SURFACE, METHOD OF MANUFACTURING SAME, AND APPARATUS THEREFOR

[75] Inventor: Masao Takakuwa, Higashimurayama, Japan

[73] Assignee: Toho Polymer Kabushiki Kaisha, Tokyo, Japan

[21] Appl. No.: 670,300

[22] Filed: Nov. 13, 1984

[30] Foreign Application Priority Data

Nov. 2, 1984 [JP] Japan ................. 59-231633

[51] Int. Cl.⁴ ............................. B41J 5/12
[52] U.S. Cl. ...................... 400/490; 400/491; 400/493; 264/132; 264/245; 264/246; 264/247
[58] Field of Search ............ 400/120, 241.1, 490, 400/491, 491.1, 491.2, 491.3, 492, 493, 493.1, 493.2, 494, 495, 495.1; 428/446, 447; 264/39, 74, 77, 78, 129, 132, 134, 135, 245, 246, 247, 271.1, 500, 509, 548, 552

[56] References Cited

U.S. PATENT DOCUMENTS

| 558,872 | 4/1896 | Devine ................... 400/491.1 |
| 563,164 | 6/1896 | Graham et al. ............ 400/491 |
| 1,989,703 | 2/1935 | Leguillon ................ 264/77 X |
| 2,646,379 | 7/1953 | Poschel ................. 428/446 X |
| 2,807,564 | 9/1957 | Mitchell ................ 264/247 X |
| 3,072,969 | 1/1963 | Du Bois .................... 264/509 |
| 3,074,840 | 1/1963 | Teplansky et al. ........ 264/132 X |
| 3,270,101 | 8/1966 | Jardine et al. .......... 264/247 X |
| 3,651,191 | 3/1972 | Glatt et al. ............ 264/132 X |
| 4,034,140 | 7/1977 | Przybyla ................... 428/447 |
| 4,039,068 | 8/1977 | Giorza et al. .............. 400/491 |
| 4,500,218 | 2/1985 | Nishikawa ................. 400/490 |

FOREIGN PATENT DOCUMENTS

| 0064041 | of 1982 | European Pat. Off. . |
| 2902892 | of 1979 | Fed. Rep. of Germany . |
| 3045962 | of 1981 | Fed. Rep. of Germany . |
| 3312127 | of 1984 | Fed. Rep. of Germany . |
| 1360187 | of 0000 | France . |

OTHER PUBLICATIONS

IBM Technical Disclosure Bulletin, "One-Use Typewriter Ribbon", Edds et al., vol. 7, No. 6, Nov. 1964, p. 421.

Primary Examiner—Ernest T. Wright, Jr.
Attorney, Agent, or Firm—Staas & Halsey

[57] ABSTRACT

An information carrier such as a push-button switch consists of a silicone elastomer. The information carrier has an a label-carrying surface in which there is embedded a printing ink having a vulcanizing mechanism similar to that of the silicone elastomer. The ink and silicone elastomer are vulcanized to form the ink into a pattern on the label-carrying surface. The label-carrying surface having the pattern embedded therein constitutes a non-glossy surface of a predetermined roughness. Also disclosed are a method and apparatus for manufacturing the information carrier by printing the printing ink on a transfer plate, which has a roughness of several microns, followed by half vulcanization to embed a pattern which is manifested by the printing ink into the label-carrying surface of the information carrier.

13 Claims, 12 Drawing Figures

FIG. 1

FIG. 2(A)    BEFORE MOLDING

FIG. 2(B)    DURING MOLDING

FIG. 2(C)    AFTER MOLDING

INFORMATION CARRIER, HAVING A ROUGHENED SURFACE, METHOD OF MANUFACTURING SAME, AND APPARATUS THEREFOR

BACKGROUND OF THE INVENTION

This invention relates to an information carrier as well as a method and apparatus for manufacturing the same. In the present invention, the term "information carrier" covers a wide range of information carriers that support operating information, input information and the like in a variety of electronic devices, industrial devices and devices for public services. The term "label-carrying surface" for an information carrier covers a wide range of surfaces that indicate the function of information carriers. Examples of such information carriers are keyboards and tablet input units of switchboards, electronic desk-top computers, devices for handling information, and the like. An example of such an information carrier is a push-button switch consisting of a rubber elastomer molded into a dome-shaped configuration and used on a keyboard of a small-size electronic computer or the like. The top surface of the push-button switch forms the key top on which there is generally printed a character switch as a numeral or arithmetic symbol to indicate the function of the key.

In the specifications of Japanese Patent Application Laid-Open No. 57-201688 and U.S. application Ser. No. 380,414 (filed on May 20, 1982, now U.S. Pat. No. 4,500,218 issued Feb. 19, 1985), both commonly-assigned to Toho Kabushiki Kaisha, the same assignee of the subject invention, there is disclosed an information carrier and a method of manufacturing the carrier, in which a pattern is screen printed on a transfer plate through use of a silicone rubber ink and the pattern is embedded in the top of the information carrier, one example of which is a key top. A drawback encountered in this proposed information carrier is that the surface (stationary surface) of the conventional transfer plate bearing the printed pattern is not capable of applying a fixing force to the pattern to fix the pattern against slippage caused by the flow of a molding material within a mold used to form the information carrier. Consequently, when the mold is closed and molding is carried out, the pattern slips on the transfer plate owing to the flow of the material internally of the mold, thereby causing the pattern to sustain a positional shaft, deformation and distortion.

Furthermore, since the transfer plate has a smooth surface, the surface of the molded information carrier is smooth and glossy. This causes the ambient light incident thereon to reflect so that reading the character borne by the carrier is difficult. Moreover, if the surface of the information carrier is too smooth, the finger of the operator clings to the carrier and is somewhat difficult to withdraw from the key top, thereby impeding smooth operation. In addition, dust floating in the air tends to attach itself to a smooth surface and cannot be readily removed from the surface.

SUMMARY OF THE INVENTION

An object of the present invention is to provide an information carrier, as well as a method and apparatus for manufacturing the same, which information carrier bears a clearly visible embedded pattern that neither blurs nor shifts positionally.

Another object of the present invention is to provide an information carrier, as well as a method and apparatus for manufacturing the same, which information carrier is easy to operate and possesses a substantially non-reflective, readily viewable surface by virtue of eliminating carrier surface smoothness and reducing the amount of surface reflection.

Still another object of the present invention is to provide an information carrier, as well as a method and apparatus for manufacturing the same, in which positional shifting of a pattern embedded in the carrier is prevented and the carrier is provided with an easy-to-clean surface having an excellent touch and reduced reflection.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

The present invention will now be described in detail with reference to the accompanying drawings illustrating a preferred embodiment thereof. It should be noted that the present invention can be applied to an information carrier which is capable of being operated by the hands of an operator or user. Though various uses are feasible, the embodiment which will now be described applies the present invention to a push-button switch serving as a typical application of the invention.

Figure 1:
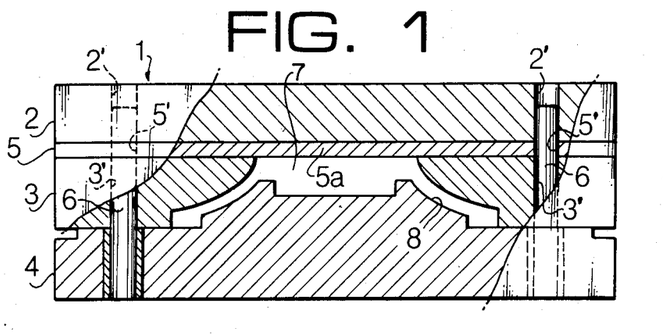
FIG. 1 is a sectional view showing an embodiment of a mold for molding a push-button switch (rubber push-button) embodying the present invention.

With reference to FIG. 1, a mold for forming the body of a push-button switch is indicated generally at numeral 1. The mold 1 includes an upper mold 2, an intermediate mold 3 and a lower mold 4. Inserted between the upper mold 2 and the intermediate mold 3 is a transfer plate 5 consisting of a material such as stainless steel. Guide holes 2', 3' and 5' are bored through the molds 2, 3 and the transfer plate 5, respectively, on the left and right sides thereof in such a manner as the communicate with one another with registered. A guide pin 6 projects upwardly from the lower mold 4 near each of the right and left side edges thereof. The guide pins 6 are received by the registered holes 2', 3' and 5' of the superimposed upper mold 2, intermediate mold 3 and transfer plate 5. It will be appreciated from FIG. 1 that the intermediate mold 3 and lower mold 4 are provided with a cavity 7 and a projection 8, respectively, for molding a push-button switch. The projection 8 is so positioned as to be received by the cavity 7 when the upper and lower molds 3, 4 are in a superimposed, closed state. It should be noted that the upper portion of the cavity 7 in intermediate mold 3 corresponds to the key top portion of the push-button switch to be molded. Further, the arrangement is such that a portion 5a of the transfer plate 5 is constantly exposed to the upper portion of the cavity 7 when the transfer plate 5 is embraced by the upper mold 2 and intermediate mold 3 at closure.

Let us now discuss the importance of the surface condition of the transfer plate 5 used in the above-described mold 1.

Figure 2A:
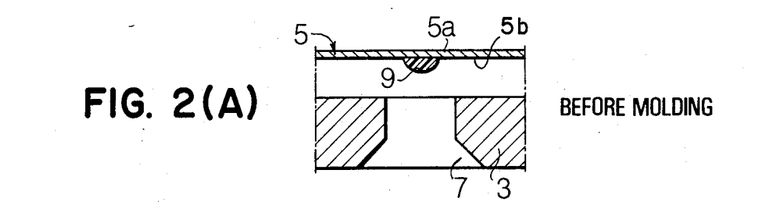
FIGS. 2A, 2B and 2C are sectional views illustrating the relationship between a pattern on a transfer plate and a molding material charged into a mold before, during and after a molding operation.
Figure 2B:
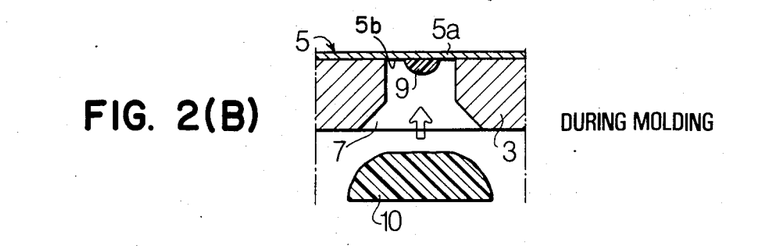
Figure 2C:
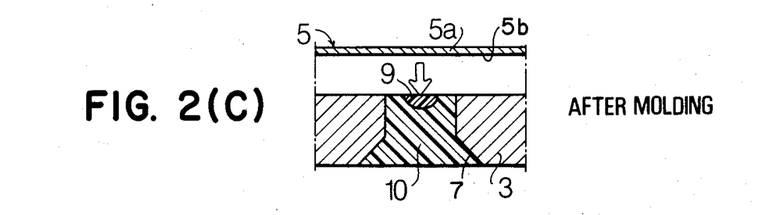

When fixing an ink to the transfer plate 5 followed by embedding the ink into a portion of a key top by using a transfer technique, an important consideration is the strength at which the ink is adhered to the transfer plate 5. Bonding strength is important in that the pattern printed on the transfer plate 5 is in no way secured physically or in terms of shape. In the manufacture of an article on which printing is performed by an embedding process, such printing is impossible unless the strength at which the ink is bonded to the transfer plate 5 lies within a proper range. In the present disclosure and when referring to the invention, the term "code" shall refer to all patterns manifested by embedding, such as characters, symbols and graphics. More specifically, as shown in FIG. 2, the code, which is indicated by reference numeral 9, must not peel off the transfer plate 5 due to the flowability of a silicone rubber molding material 10 when press-molding is carried out, and must be transferred completely from the transfer plate 5 to the silicone rubber molding material 10 at the completion of molding. A critical factor which affects the bonding strength is the surface condition of the transfer plate 5. To attain an appropriate bonding strength, surface 5b of the transfer plate 5 must be given a roughness approximately 0.1 micron to 3.0 microns (roughness is defined as the mean depth of the surface pitting). This roughness can be applied, for example by any of the processes of shotblasting, soundblasting, or etching. Although, many treatments may be utilized to achieve the surface roughness of the transfer plate 5, hereinafter these treatments are referred to using only a single term, i.e. sandblasting. If the transfer plate 5 has too rough of a surface above 3.0 microns, the ink forming the code 9 on the transfer plate 5 will not transfer smoothly to the silicone rubber molding material 10 due to excess bonding strength between the code 9 and the transfer plate 5. If the transfer plate 5 has a very smooth surface between 0.1 micron, the result is too little bonding strength so that the ink code 9 is caused to drift due to the flowability of the material 10 when press-molding is carried out. As a result of the surface treatments used according to the invention, the surface 5b of the transfer plate 5 is made rough on a scale of approximately 0.1 micron to 3.0 microns. FIG. 2A shows the situation prior to molding, in which the code 9 is still affixed to the transfer plate 5 before the mold 1 is closed. FIG. 2B shows molding in progress, in which the transfer plate 5 is in pressured contact with the upper side of the intermediate mold 3 to expose to code 9 to the interior of the molding cavity 7, while the silicone rubber molding material 10 is introduced into the cavity 7 from below. FIG. 2C illustrates the situation at the end of molding, in which the code 9 has been transferred from the transfer plate 5 to the material 10.

The preferred embodiment of the present invention will now be described in greater detail with reference to FIGS. 3 through 8.

Figure 3A:
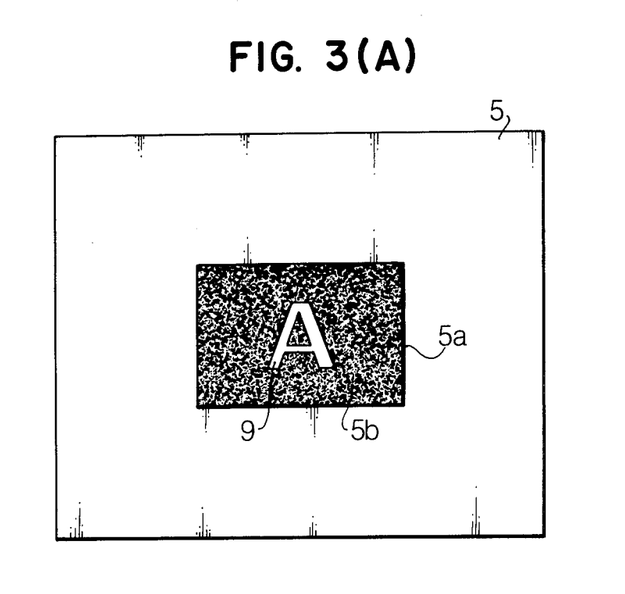
FIGS. 3A and 3B are plan and side views, respectively, of a transfer plate disposed in a mold.
Figure 3B:
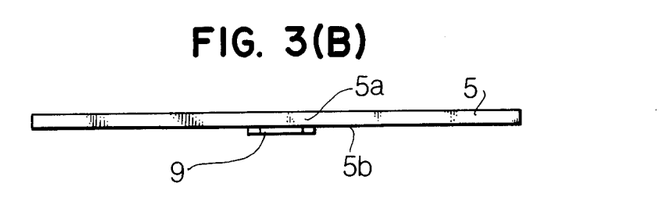

As shown in FIGS. 3A and 3B, the transfer surface 5b of the transfer plate 5 is subjected to sandblasting. The sandblasting treatment is applied to an area or portion 5a exposed to the upper portion of the cavity 7 formed in the intermediate mold 3, thus to form a sandblasted, non-glossy face or transfer surface 5b of a desired roughness or texture. This is step S1 of the manufacturing process shown in FIG. 8. It should be noted that the entirety of the transfer surface 5b of the transfer plate 5 may be sandblasted if so desired.

Next, in step S2 of the manufacturing process, the code 9 to be printed on the key top of a push-button switch is affixed to the sandblasted surface 5b of the transfer plate 5 by a silk screen printing method using a printing ink. It should be noted that the code 9 affixed to the transfer plate 5 in this manner will be raised somewhat from the plate transfer surface 5b, as shown in FIG. 3B. The printing ink used in this case is a mixture of a polysiloxane polymer, curing agent, and pigment for coloration. In addition, the inner surface of the cavity 7 in the intermediate mold 3 and the surface of the projection 8 within the lower mole 4 are finished to smooth mirror surfaces. With this construction, the bonding strength between the code 9 and the sandblasted transfer surface 5b of the transfer plate 5 advantageously takes on a value smaller than the fusing strength between the code 9 and the silicone rubber molding material 10 constituting the push-button switch, yet not so small as to permit the code 9 to be peeled off by the flowability of the molding material 10 when the mold 1 is pressed into the molding position.

Figure 4:
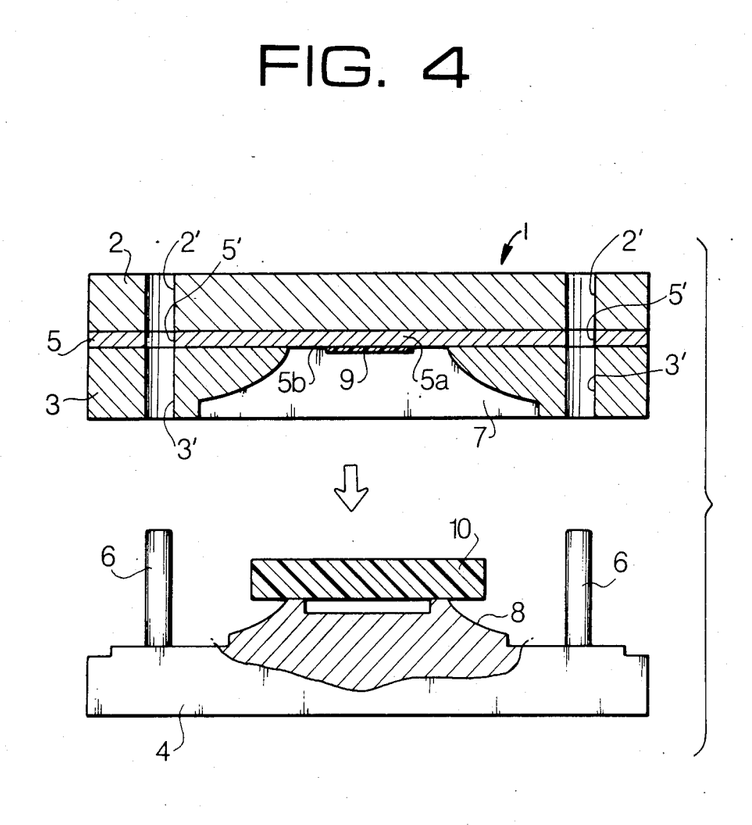
FIG. 4 is a sectional view of a mold and illustrates operations for introducing a transfer plate into the mold, supplying the mold with a molding material and closing the mold.
Figure 8:
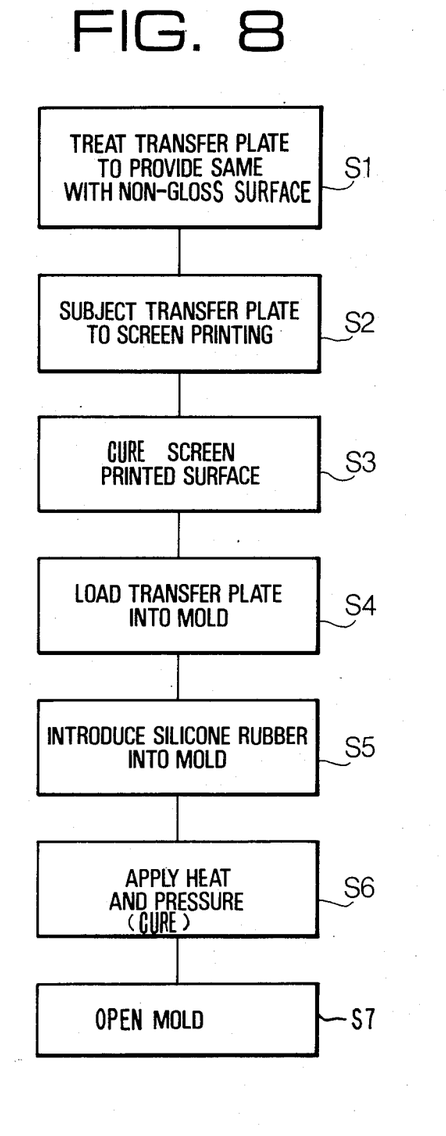
FIG. 8 is a view showing the process through which a push-button switch is manufactured.

The code 9 is then allowed to cure on the transfer plate 5 as noted by step S3 in FIG. 8. Thereafter, as shown in FIG. 4, the upper mold 2 and intermediate mold 3 are brought together to embrace from both sides the transfer plate 5 having the code 9 affixed thereto in the manner described above, in which state the molds 2 and 3 are secured by suitable means, not shown, with the sandblasted, non-glossy transfer surface 5b of the transfer plate 5 being exposed to the cavity 7. This is step S4 of the manufacturing process as noted in FIG. 8. Next, in step S5, the silicone rubber molding material 10 of a predetermined size, and which serves as the raw material for fabricating the push-button switch of the illustrated embodiment, is placed on the projection 8 of the lower mold 4. The upper mold 2, transfer plate 5 and intermediate mold 3 are then superimposed on the lower mold 4 with the guide pins 6 being inserted into the registered holes 2', 3' and 5'.

The mold 1 closed in this manner is submitted to heat and pressure by means of a pressing machine in step S6, as will now be described.

Figure 5:
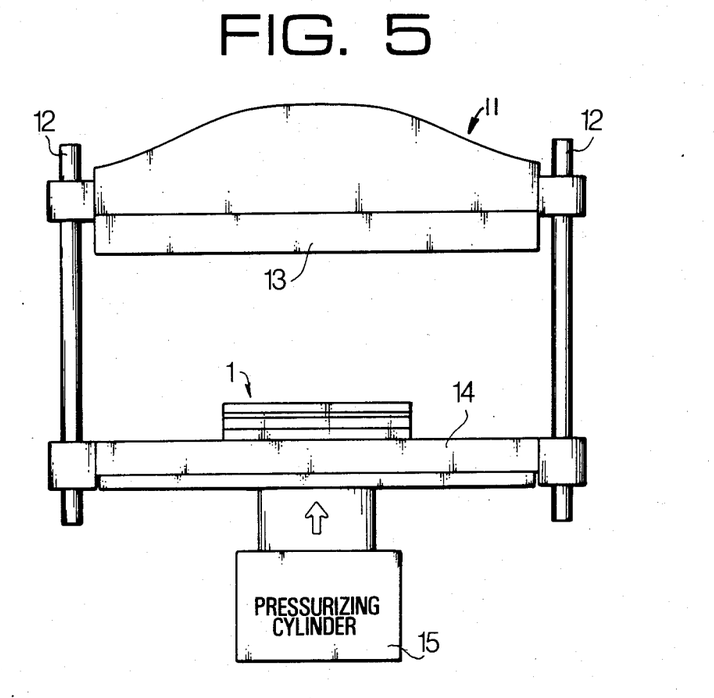
FIG. 5 is a side view illustrating an example of a pressing machine.

An example of the pressing machine is shown in FIG. 5. The pressing machine, indicated generally by numeral 11, includes guideposts 12, a heating platen 13 secured at the upper portion of the guideposts 12, a heating platen 14 mounted on the guideposts 12 for vertical movement, and a pressurizing cylinder 15 for driving the heating platen 14 along the guideposts 12. The mold 1 is attached to the heating platen 14 in the manner shown in FIG. 5 and the heating platen 14 is elevated by the pressurizing cylinder 15, thereby compressing the mold 1 between the heating platens 13 and 14 to heat and compress the molding material 10 simultaneously.

Figure 6:
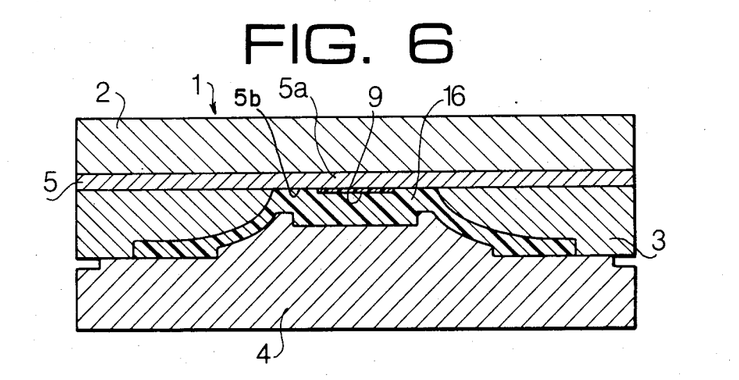
FIG. 6 is a sectional view illustrating a silicone rubber pressed within the mold.
Figure 7A:
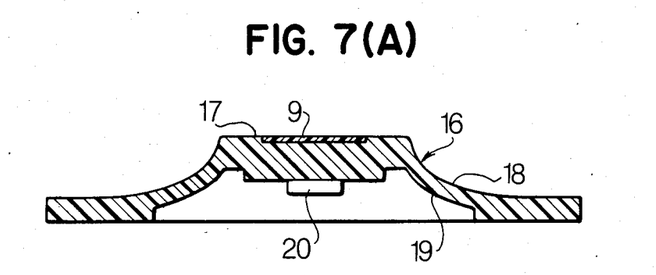
FIGS. 7A and 7B are sectional side and perspective views, respectively, illustrating an example of a push-button switch.
Figure 7B:
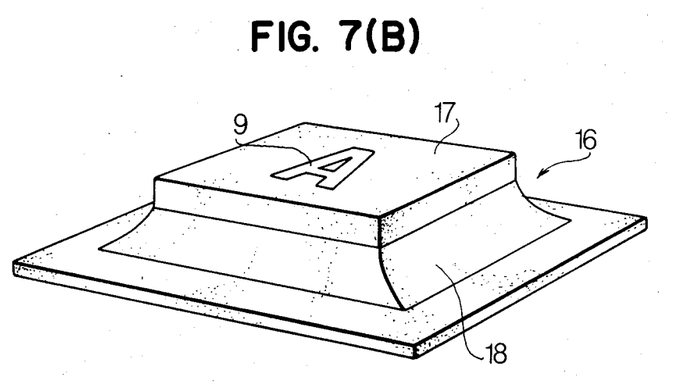

As best shown in FIGS. 6, 7(A) and 7(B), the application of heat and pressure in the above manner causes the silicone rubber molding material 10 to fill the cavity 7 delimited by the intermediate mold 3 and the projection 8 of the lower mold 4, thereby molding the material 10 into a rubber push-buttom switch 16. At the same time, the code 9 affixed to the transfer plate 5 is embedded into the silicone rubber molding material 10 to a depth at least equivalent to the thickness of the code 9, after which the code 9 is vulcanized to integrate the code 9 with the silicone rubber molding, material 10. The vulcanization takes place because the printing ink forming the code 9 includes the polysiloxane polymer which exhibits a vulcanizing mechanism similar to that of the silicone rubber molding material 10. Vulcanizing two materials having similar vulcanizing mechanisms while one is embedded in the other fuses the materials together to form a unitary body. When the mold 1 is opened in step S7, therefore, the result is a push-button switch 16 having the shape shown in FIGS. 7A and 7B. The push-buttom switch 16 has a key-top surface 17 in which the code 9 is integrally embedded. The key-top surface 17 of the molded push-button switch 16 is roughened and rendered non-glossy by virtue of the sandblasted surface 5b of the transfer plate 5. Other portions of the push-buttom switch 16, namely an outer surface 18 corresponding to the cavity 7 of the intermediate mold 3 and an inner surface 19 corresponding to the projection 8 of the lower mold 4, are glossy. Numeral 20 denotes a contact, such as an electrically conductive rubber, which is provided on the inner surface 19 of the push-button switch 16.

In manufacturing the push-button switch 16 of the illustrated embodiment in the manner described above, the arrangement is such that the printing ink constituting the code 9 on the transfer plate 5 is embedded in the silicone rubber molding material 10 following sufficient hardening in order to half-vulcanize the embed the ink of code 9 interiorly of the heating oven. Since the embedded code 9 will therefore have a prescribed strength, the printed code 9 will not run or blur. Further, since the sandblasted surface 5b is formed on the transfer plate 5, and since the code 9 is affixed to this surface 5b, friction of considerable magnitude develops between the transfer plate 5 and the code 9 so that slippage of the code 9 on the transfer plate 5 is prevented. This assures that the code 9 will not be embedded in the key-top surface 17 in a positionally shifted state.

Furthermore, since the key-top surface 17 of the molded push-button switch 16 is, together with the code 9, molded into a non-glossy, roughened surface owing to the non-glossy, sandblasted surface 5b of the transfer plate 5, the key-top surface 17 is provided with slight ruggedness which prevents the operator's finger from sticking to the key top, thereby allowing the finger to be withdrawn from the key with ease. Since the key-top surface 17 is not molded into a mirror surface, the code 9 exhibits little reflection and can therefore be read with ease.

In accordance with the present invention as described and illustrated above, there can be provided an information carrier, as well as a method and apparatus for manufacturing the same. The information carrier has a clearly visible code which can be affixed to a key top having an excellent touch without the code blurring or shifting in position. Since the carrier surface has a prescribed roughness, the code will not be rendered difficult to see due to light reflected from the key top. The surface roughness also is useful in facilitating the cleaning of the key top.

Though the foregoing description relates to molding of a single push-button switch 16 having the above-described key top in order to simplify the understanding of the present invention, it is of course possible to mold a plurality of such push-button switches simultaneously by a single mold so that the push-button switches may be used in a well-known keyboard or the like. In such case, those portions of a single transfer plate 5 corresponding to respective key tops, or the entire surface of the transfer plate, would be sandblasted and a plurality of the codes would be transferred simultaneously. In other words, well-known techniques may be applied as is to portions unrelated to the present invention.

While the foregoing embodiment has been described in connection with silicone rubber serving as an example of the molding material, it should be obvious that the present invention can be practiced using a silicone elastomer consisting of a mixture of silicone rubber and a synthetic rubber as the molding material.

As may apparently widely different embodiments of the present invention can be made without departing from the spirit and scope thereof, it is to be understood that the invention is not limited to the specific embodiments thereof except as defined in the appended claims.

What is claimed is:

1. An information carrier formed of a vulcanized silicone elastomer base material, the information carrier comprising: (a) a code manifested by a printing ink with a vulcanizing mechanism similar to that of the silicone elastomer base material of the information carrier, the code being embedded in the soft silicone elastomer base material half-vulcanized before vulcanizing the information carrier and completely combined with the base material of said information carrier without distortion; and (b) a label-carrying surface having a roughness so as not to cause said printing ink to drift due to the flowability of the base material of the information carrier.

2. The information carrier according to claim 1, wherein the label-carrying surface has a roughness in the range of approximately 0.1 micron to 3.0 microns.

3. The information carrier according to claim 1, wherein portions of the information carrier other than the label-carrying surface are glossy surfaces.

4. The information carrier according to claim 1, wherein the printing ink consists of a mixture of a polysiloxane polymer and a pigment.

5. The information carrier according to claim 1, wherein said information carrier constitutes a switch frame of a key switch, and said label-carrying surface is a key top of the key switch.

6. A method of manufacturing an information carrier of a silicone elastomer molding material, comprising the steps of:
    printing a predetermined code on a transfer plate with printing ink having a vulcanizing mechanism similar to that of the silicone elastomer molding material, the transfer plate having a roughness so as not to cause the printing ink to drift due to the flowability of the silicone elastomer molding material of the information carrier;

half vulcanizing said code which has been printed on said transfer plate;

disposing said transfer plate inside a mold for forming the information carrier and introducing the silicone elastomer molding material into the inside of the mold;

molding the silicone elastomer molding material into an information carrier by pressurizing and vulcanizing; and wherein the silicone elastomer molding material inside said mold and the code on said transfer plate are vulcanized together, and said code is embedded integrally in a label-carrying surface of the information carrier molded from said silicone elastomer molding material.

7. The method of manufacturing an information carrier according to claim 6, wherein the silicone elastomer molding material is introduced into the inside of the mold after the transfer plate is disposed inside the mold.

8. The method of manufacturing an information carrier according to claim 6, wherein the roughness is in the range of approximately 0.1 micron and 3.0 microns.

9. An apparatus for manufacturing an information carrier, comprising:

a mold for molding a molding material consisting of a silicone elastomer into an information carrier;

a transfer plate having a portion corresponding to a label-carrying surface of the information carrier disposed inside said mold for transferring a pattern to the label-carrying surface of said information carrier, said pattern being formed by a printing ink having a vulcanizing mechanism similar to that of the silicone elastomer molding material and beforehand having been bonded on a surface of said transfer plate, and said transfer plate having a roughness so as not to cause said printing ink to drift due to the flowability of the silicone elastomer molding material of the carrier on which said pattern is affixed by vulcanization;

heating means for heating said mold; and pressuring means for applying pressure to said mold.

10. The apparatus according to claim 9, wherein the roughness of said transfer plate is in the range of approximately 0.1 micron to 3.0 microns.

11. The apparatus according to claim 9, wherein said transfer plate is made of stainless steel.

12. The apparatus according to claim 9, wherein only a portion of the transfer plate corresponding to the label-carrying surface of the information carrier is a roughened surface.

13. The apparatus according to claim 9, wherein an inner surface of the mold for molding the information carrier is a smooth mirror surface.

* * * * *

UNITED STATES PATENT AND TRADEMARK OFFICE
CERTIFICATE OF CORRECTION

PATENT NO. : 4,657,419

DATED : April 14, 1987

INVENTOR(S) : Masao Takakuwa

It is certified that error appears in the above-identified patent and that said Letters Patent is hereby corrected as shown below:

Column 2, line 64, "the" should be --to--.

Column 3, line 55, "between" should be --below--.

Column 5, line 42, "the" (1st occurrence) should be --and--.

Column 6, line 27, "may" should be --many--.

Signed and Sealed this

Eighteenth Day of August, 1987

Attest:

DONALD J. QUIGG

Attesting Officer

Commissioner of Patents and Trademarks